(12) United States Patent
Laurent et al.

(10) Patent No.: US 10,229,093 B2
(45) Date of Patent: Mar. 12, 2019

(54) METHOD AND SYSTEM FOR IMPLEMENTING A COMMON DATA INTERFACE TO WEB SERVICES

(71) Applicant: Oracle International Corporation, Redwood Shores, CA (US)

(72) Inventors: Nicole Jodie Laurent, Lakewood, CO (US); David W. Nowakowski, Thorton, CO (US); Michael Eide, Lafayette, CO (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 805 days.

(21) Appl. No.: 13/754,869

(22) Filed: Jan. 30, 2013

(65) Prior Publication Data

US 2013/0198611 A1    Aug. 1, 2013

Related U.S. Application Data

(60) Provisional application No. 61/593,077, filed on Jan. 31, 2012.

(51) Int. Cl.
| | |
|---|---|
| *G06F 17/22* | (2006.01) |
| *G06F 9/54* | (2006.01) |
| *G06F 8/36* | (2018.01) |
| *G06F 8/38* | (2018.01) |
| *H04L 29/08* | (2006.01) |

(52) U.S. Cl.
CPC ............ *G06F 17/2247* (2013.01); *G06F 8/36* (2013.01); *G06F 8/38* (2013.01); *G06F 9/541* (2013.01); *H04L 67/02* (2013.01)

(58) Field of Classification Search
None
See application file for complete search history.

(56) References Cited

U.S. PATENT DOCUMENTS

| | | |
|---|---|---|
| 7,797,400 B2 | 9/2010 | Singh et al. |
| 2004/0103407 A1 | 5/2004 | Blaukopf et al. |
| 2004/0111533 A1 | 6/2004 | Beisiegel et al. |
| 2007/0073753 A1 | 3/2007 | Baikov |

(Continued)

FOREIGN PATENT DOCUMENTS

| | | |
|---|---|---|
| CN | 101388910 A | 3/2009 |
| CN | 101719059 A | 6/2010 |
| EP | 2 343 658 A1 | 7/2011 |

OTHER PUBLICATIONS

International Search Report and Written Opinion dated Apr. 22, 2013 for PCT Patent Application No. PCT/US2013/023943, 8 pages.

(Continued)

*Primary Examiner* — Scott T Baderman
*Assistant Examiner* — Steve P Golden
(74) *Attorney, Agent, or Firm* — Vista IP Law Group, LLP

(57) ABSTRACT

Disclosed are methods and systems for developing web services for a plurality of platforms utilizing a plurality of web service specification languages. A common data layer is used to map classes of different web service specification languages to a common class hierarchy. This allows for the creation of data layers independent of each individual web service specification language, reducing the requirement to implement duplicate data controls for each web service specification language.

16 Claims, 6 Drawing Sheets

(56) References Cited

U.S. PATENT DOCUMENTS

| | | | |
|---|---|---|---|
| 2007/0118844 A1 | 5/2007 | Huang et al. | |
| 2007/0156756 A1 | 7/2007 | Stoyanova | |
| 2008/0059558 A1* | 3/2008 | Singh et al. | 709/202 |
| 2008/0091954 A1 | 4/2008 | Morris et al. | |
| 2008/0155557 A1 | 6/2008 | Bezrukov et al. | |
| 2009/0204976 A1 | 8/2009 | Hurek et al. | |
| 2009/0282136 A1* | 11/2009 | Subramanian | G06F 8/30 709/222 |
| 2010/0094905 A1* | 4/2010 | Nikolov | G06F 9/465 707/792 |
| 2011/0023017 A1* | 1/2011 | Calvin | 717/120 |
| 2011/0060790 A1 | 3/2011 | Subramanian et al. | |
| 2011/0145699 A1 | 6/2011 | Kheiri et al. | |
| 2011/0321022 A1 | 12/2011 | Soundrapandian | |

OTHER PUBLICATIONS

Extended European Search Report dated Nov. 24, 2014 for corresponding EP Patent Application No. 13744112.7, 11 pages.

Ralph Gordon, et al., "Chapter 14—Exposing Web Services Using the ADF Model Layer", "Chapter 26—Creating a Basic Databound Page", "Chapter 13—Using ADF Model in a Fusion Web Application", Oracle Fusion Middleware—Fusion Developer's Guide for Oracle Application Development Framework 11 g Release 2, May 2011, 76 pages.

Ted Farrelll, et al., "JSR 227: A Standard Data Binding & Data Access Facility for O2EE", The Java Community Process Program—JSRs: Java Specification Requests, Nov. 11, 2008, 20 pages.

Notification of the First Office Action dated Mar. 30, 2016, for corresponding Chinese Patent Application No. 201380014488.7, 15 pages.

Ralph Gordon, et al, "Fusion Developer's Guide for Oracle Application Development Framework", Sep. 30, 2011, 10 pages.

Communication Pursuant to Article 94(3) EPC dated Apr. 25, 2016 for corresponding European Application No. 13 744 112.7, 7 pages.

European Communication dated Dec. 19, 2016 for corresponding EP Patent Application No. 13 744 112.7, 6 pages.

Yehia Taher, et al., "Towards an Approach for Web services Substitution", IEEE 10th International Symposium Database Engineering and Applications, 2006 (IDEAS '06), pp. 1-8.

Notification of the Second Office Action dated Dec. 5, 2016 for corresponding Chinese Patent Application No. 201380014488.7, 17 pages.

Notification of the Third Office Action dated Jun. 6, 2017, for corresponding Chinese Patent Application No. 201380014488.7, 12 pages.

* cited by examiner

METHOD AND SYSTEM FOR IMPLEMENTING A COMMON DATA INTERFACE TO WEB SERVICES

CROSS-REFERENCE TO RELATED APPLICATIONS

The present application claims the benefit of priority to U.S. Provisional Application Ser. No. 61/593,077, filed on Jan. 31, 2012, which is hereby incorporated by reference in its entirety.

BACKGROUND

Development platforms are often provided by makers of computing systems to allow third parties to develop applications to interface with the computing system. For example, Oracle Corporation provides a development platform called the application development framework ("ADF") to facilitate development of applications that access Oracle application servers. Oracle ADF includes a set of standards-based Java Server Faces (JSF) components with built-in Ajax functionality. With these components, web deployed user interfaces can be developed with a level of functionality and interactivity previously reserved for thick-client applications. The components offer data interaction, data visualization, and encapsulated browser side operations in a set of easy to use components that provide for very effective and efficient client application development.

Such development platforms often utilize web service specification languages, such as a web services description language (WSDL), to implement web services for the applications. A WSDL description of a web service (also referred to as a WSDL file) provides a machine-readable description of how the service can be called, what parameters it expects, and what data structures it returns. A client program connecting to a web service can therefore read the WSDL file to determine what operations are available on the server.

When consuming a web service, there are generally two ways to consume the service:
  A web service proxy is generated based on the web service WSDL and then a data control is built based on the proxy classes.
  A data control is generated directly based on the WSDL.

In the case of bottom up developed services, the WSDL may be different on different application servers. In this type of development, Java classes are written first and then the WSDL is generated based on those classes. The generation is done on the platform the services will be deployed to (with different generation tools) and so the resulting WSDLs may be different. For example, the same message may correspond to different names of the elements in the different WSDLs. In some cases, the entire structure of the messages is also different.

For each of these different WSDLs (which really represent the same or similar services) a different proxy is generated, or a different data control is generated. If one is to use these WSDLs directly, it could lead to duplicate data controls and potentially duplicate forms. This is disadvantageous since it is undesirable to manage multiple versions of the same data control. Also, if a new platform is introduced, the application would require yet another data control for the new WSDL and a new form to use that data control. Additionally, when basing the data control directly on the WSDL, the data control attributes are limited to only the fields and methods of that WSDL.

Therefore, there is a need for an improved method, system, and computer program product that addresses these problems with the prior approaches.

SUMMARY

Some embodiments of the invention address the above problems of having to manage duplicate data controls by using a common data layer. The common data layer maps classes of each WSDL to a common class hierarchy. Data controls used to generate pages are then created based upon the common class hierarchy, instead of being based upon individual WSDLs. This reduces the requirement to implement and manage duplicate data controls for multiple WSDLs describing the same or similar services.

Further details of aspects, objects, and advantages of the invention are described below in the detailed description, drawings, and claims. Both the foregoing general description and the following detailed description are exemplary and explanatory, and are not intended to be limiting as to the scope of the invention.

DETAILED DESCRIPTION

Figure 1A:
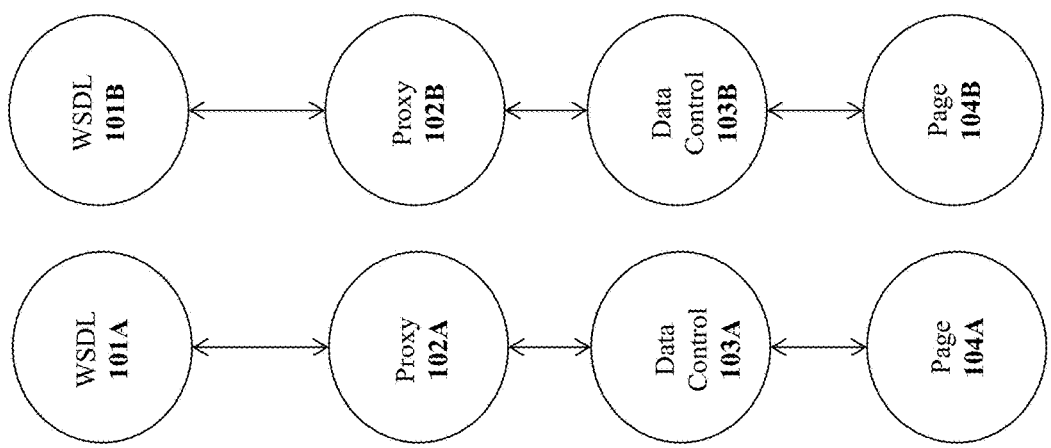
FIG. 1A illustrates an example of one possible approach for implementing web services for a plurality of platforms utilizing a plurality of web service specification languages.

Various embodiments are described hereinafter with reference to the figures. It should be noted that the figures are not drawn to scale and that the elements of similar structures or functions are represented by like reference numerals throughout the figures. It should be noted that the figures are only intended to facilitate the description of the embodiments. They are not intended as an exhaustive description of the invention or as a limitation on the scope of the invention. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments. In addition, for the purposes of illustration and explanation, the present disclosure is described in various embodiments in the context of ADF applications. It is noted, however, that the invention is not limited in its scope to ADF applications, and indeed, may be applied to other types of applications as well.

As noted above, even when the data model and behavior of the business services are identical, business services running on different Java 2 Platform, Enterprise Edition (J2EE) application servers may produce different WSDL files. The WSDL is the technical contract between a business service and its consumers. The application (e.g., ADF mobile application) is required to consume business services running on different business service servers depending on the customer's system. In some embodiments, these platforms may be a WebLogic Server (WLS) or a WebSphere Application Server (WAS). Because of the different WSDL files, it becomes technically challenging to support multiple business service servers in an ADF mobile application.

FIG. 1A illustrates an example of one possible approach for implementing web services for a plurality of platforms utilizing a plurality of web service specification languages. FIG. 1A shows a web service running on a plurality of application servers, wherein the application servers use a plurality of different WSDLs 101A and 101B. Web service proxies 102A and 102B may be generated based on each of the WSLDs 101A and 101B.

Data controls 103A and 103B are generated in order to consume the web service. Data controls 103A and 103B may be based on the proxy classes 102A and 102B. In other embodiments, data controls 103A and 103B can be generated based directly on WSDLs 101A and 101B. Mobile application pages and forms 104A and 104B can then be created that interact with data controls 103A and 103B.

In this approach, an entirely different proxy and data control is required for each different WSDL, despite the fact that the underlying service for the WSDLs may be similar or even exactly the same. There are many disadvantages to such a system. Directly using the WSDLs leads to having to create duplicate data controls and potentially duplicate forms. This causes difficulties when a service needs to be modified. For example, if data control 103A is modified, it is necessary to also modify data control 103B, so that pages 104A and 104B remain consistent.

The system also makes it difficult to add new platforms, because adding a new platform with a new WSDL necessitates the creation of a new data control. For example, if a new platform using WSDL 101C and proxy class 102C is to be added, it is necessary to create an entirely new data control 103C and page 104C, even though pages 104A, 104B, and 104C are all intended to represent the same or very similar data from the same web service. Additionally, this system limits the attributes of each data control to the fields and methods of the particular WSDL that the data control corresponds to. For example, data control 103A is limited to the fields and methods of WSDL 101A, and cannot take advantage of any different fields and methods that may be present in WSDLs 101B and 101C.

Some embodiments of the invention address the above problems by providing a common data layer that reduces the requirement to implement duplicate data controls, creating a loosely coupled architecture among different layers/components to minimize the dependency between layers/components. For example, instead of creating forms tightly coupled with a specific WSDL file running on a particular application server, an abstraction layer is provided instead. The abstraction layer is a generic data model shielding the technical differences between different WSDL files. Pages and forms are built on top of this data model. Based on some configuration, the data model calls different business service proxies, to call business services running either on WLS or WAS.

Figure 1B:
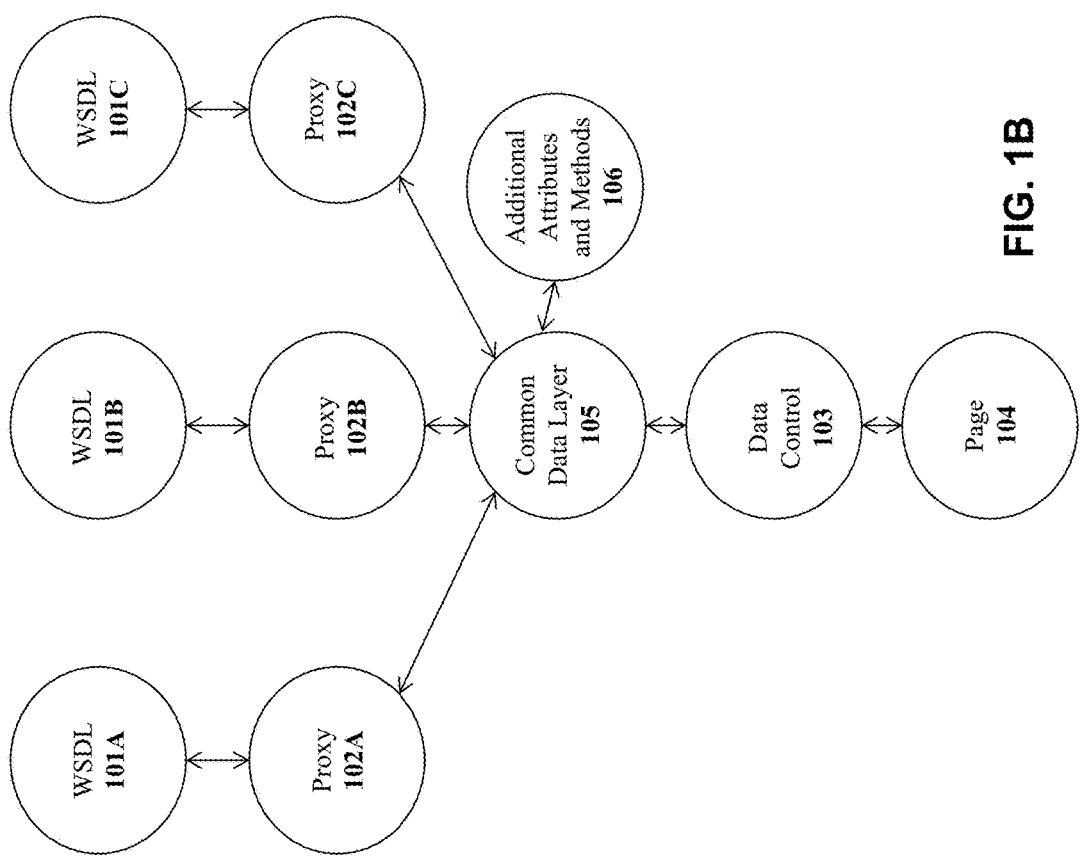
FIG. 1B illustrates some embodiments of the invention.

FIG. 1B illustrates an embodiment of the invention using a common data layer 105. The common data layer 105 includes simple classes, such as Java classes, that represent the data input and output of each web service. Data control 103 is then created based on these classes.

In general, a common class hierarchy (e.g., a set of Java classes) is created for each particular mobile application, serving as the data model for the mobile application. These classes are independent of any particular WSDL 101 or business service proxy 102. Data control 103 is created on top of these classes. Mobile pages and forms 104 are then created that interact with the data control 103.

A mapping between the classes of the proxies 102A-C and the common data layer 105 transfers the data between the two objects. The common data layer 105 thus provides a common data interface on which to base all data controls. The technical differences between the WSDLs 101A-C and the common classes are handled by calling different proxy based configurations. This means that the data control 103 and ADF mobile forms and page flows 104 are identical no matter which application server the back-end business service is running.

This approach essentially matches the content of the data being processed into and/or out from the web services, forming an abstraction layer between the WSDLs 101A-C and the data control 103. In some embodiments, each mobile application creates its own abstract data model because the data and behavior are different for each mobile application. In some embodiments, mobile applications with similar data and behavior may share a single abstract data model. For example, two different mobile applications for handling expense reports may utilize many of the same data mappings, and thus may both be able to utilize a single common data layer.

This approach provides a significant advantage since there is no longer the need to build a separate proxy and data control for each WSDL. Another benefit of this approach is that, since it is built on a loosely coupled architecture, it minimizes the impact of when changes are required in the future. The application is now insulated against new platforms that may have different WSDL representations. Adding a new platform using a new WSDL only requires that the common data layer be modified with new mappings, instead of necessitating the creation of entirely new proxies and data controls for generating a new page for the new WSDL. In addition, this approach also provides a place for additional data and methods 106 that may be needed to support the application, but are not necessarily provided by the web service. These may include calculated values, totaling, and user input, as well as additional data or attributes that may be received from other services. Not building the data control directly from the WSDL or the proxy allows for this insulation and provides a layer with useful properties and capabilities.

Figure 2:
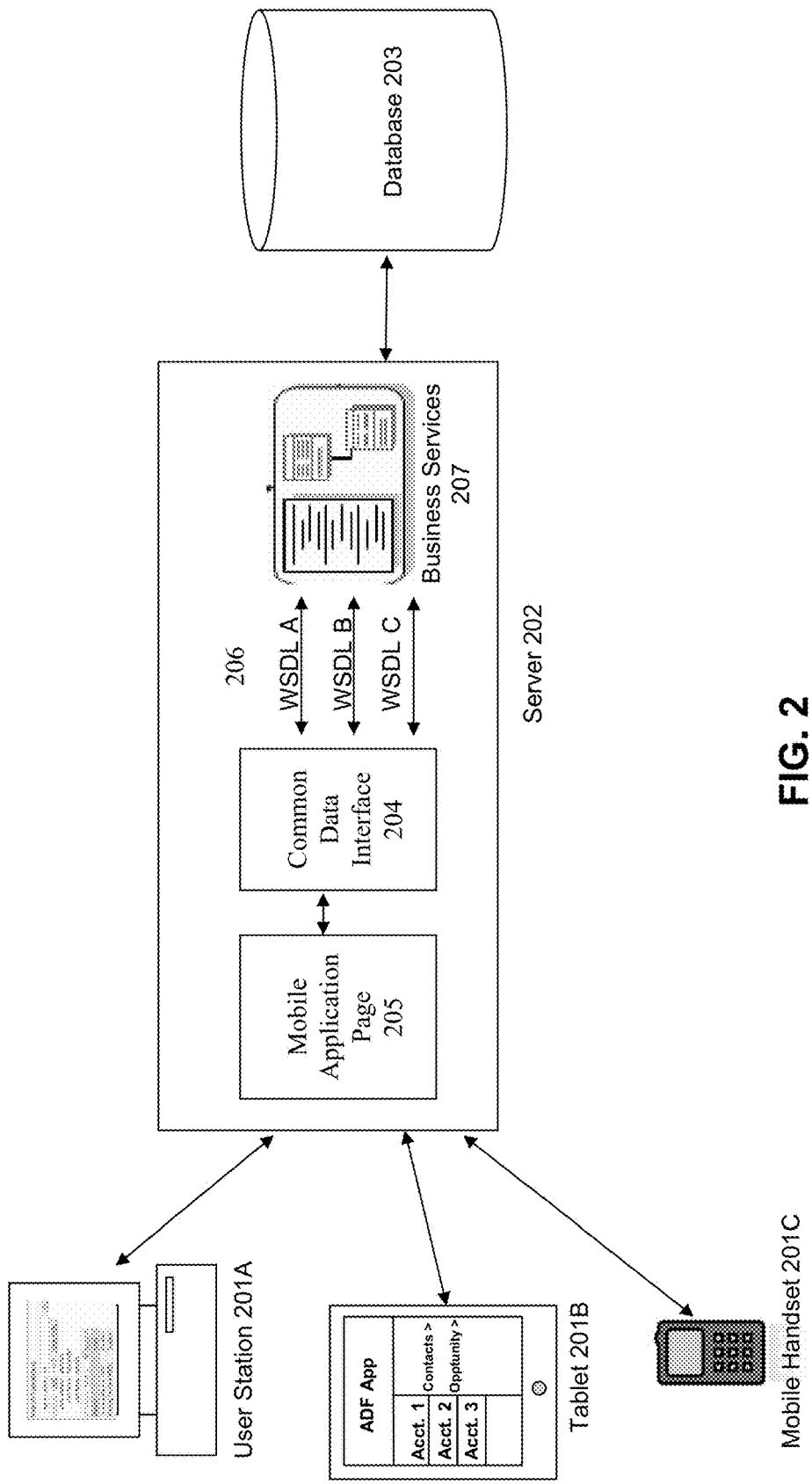
FIG. 2 illustrates a system for implementing a common data layer according to embodiments of the invention.

FIG. 2 shows an architecture of a system for implementing a common data layer according to some embodiments of the invention. The system may include one or more users at one or more user stations 201A, one or more tablet devices 201B, or one or more mobile telephone devices 201C. The users operate the system to use applications to access business services 207 on an applications server 202, which may access a database 203 to implement the business services 207. Business services 207 may be represented by a plurality of different WSDLs 206.

In this system, the user station 201A comprises any type of computing station that may be used to operate or interface with a server. Examples of such user stations include for example, workstations, personal computers, laptop computers, or remote computing terminals. The tablet device 201B comprises any type of portable tablet device, including for example, tablet computers, portable readers, etc. The mobile telephone device 201C comprises any mobile device that can suitably access an application on application server, such as smartphones and programmable mobile handsets. It is noted that the invention is not limited in its application to just these types of devices.

A common data interface 204 is provided at the server 202 to generate the application page 205 (e.g., mobile application page) for display at the user station, tablet, or mobile device 201A-C. The common data interface 204 comprises a common data layer and a data control. A plurality of WSDLs A, B, and C (206) can be used in conjunction with the common data layer and data control of the common data interface 204 to generate the mobile application page 205, rather than requiring a separate proxy and data control for each WSDL A, B, and C.

The user station, tablet device, and mobile telephone 201A-C comprises a display device, such as a display monitor or screen. User station, tablet device, and/or mobile device 201A-C may also comprise one or more input devices for the user to provide operational control over the activities of system, such as a mouse, touch screen, keypad, or keyboard. The users of the user station, tablet device, and/or mobile device correspond to any individual, organization, or other entity that uses system to remotely access applications on application server.

The database corresponds 203 to any type of computer readable mediums or storage devices. The computer readable storage devices comprise any combination of hardware and software that allows for ready access to the data within database. For example, the computer readable storage device could be implemented as computer memory or disk drives operatively managed by an operating system.

Figure 3:
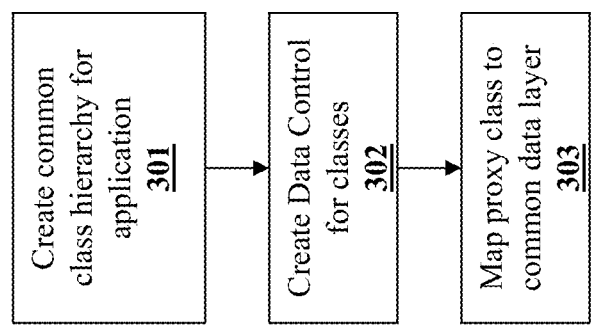
FIG. 3 illustrates a flowchart of an approach for implementing a common data layer according to embodiments of the invention.

FIG. 3 illustrates a flowchart of an approach to implement a common data layer. The process is performed by first creating a common class hierarchy (e.g., a Java class hierarchy) for the mobile application to serve as the data model at 301. These classes will be based upon the fields and data that are desired to be used on the mobile forms and pages, and are independent on any particular WSDL or business service proxy.

Next, a data control is created for the common classes at 302. The mobile forms are then created that interact with the data control. A mapping is therefore created at 303 that maps the proxy class to the common classes, where the new common data layer provides a common data interface on which to base the data controls. The technical differences between the WSDLs and the common classes are handled by calling different proxy based configuration. This means that the data control and mobile forms and page flows are identical no matter on which application server the back-end business service is running.

Figure 4:
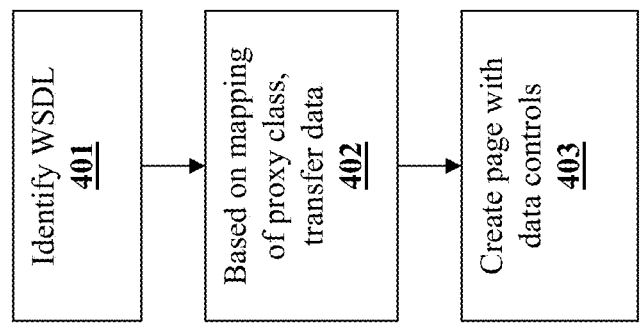
FIG. 4 illustrates a flowchart of an approach for using a common data layer according to embodiments of the invention.

FIG. 4 illustrates a flowchart of an approach to use the common data layer. The process begins at 401 with generating an instance of the class associated with the page that is to invoke a web service, and based on a configuration, identifying the service and the WSDL that will be used.

Next, at 402, based on the previously configured mappings, data is transferred between the service and the common class objects. To do this, a payload is sent through the proxy to the server where the web service is deployed. In some embodiments, the payload is in the form of an XML document. The server then receives, processes and responds to the payload, which is sent back through the proxy and mapped back to the common data layer. At this point, the page can be created using the data control and the transferred data at item 403.

Therefore, what has been described is an improved approach to address consumption of web services from an application, where a common data layer is provided that reduces the requirement to implement duplicate data controls.

System Architecture Overview

Figure 5:
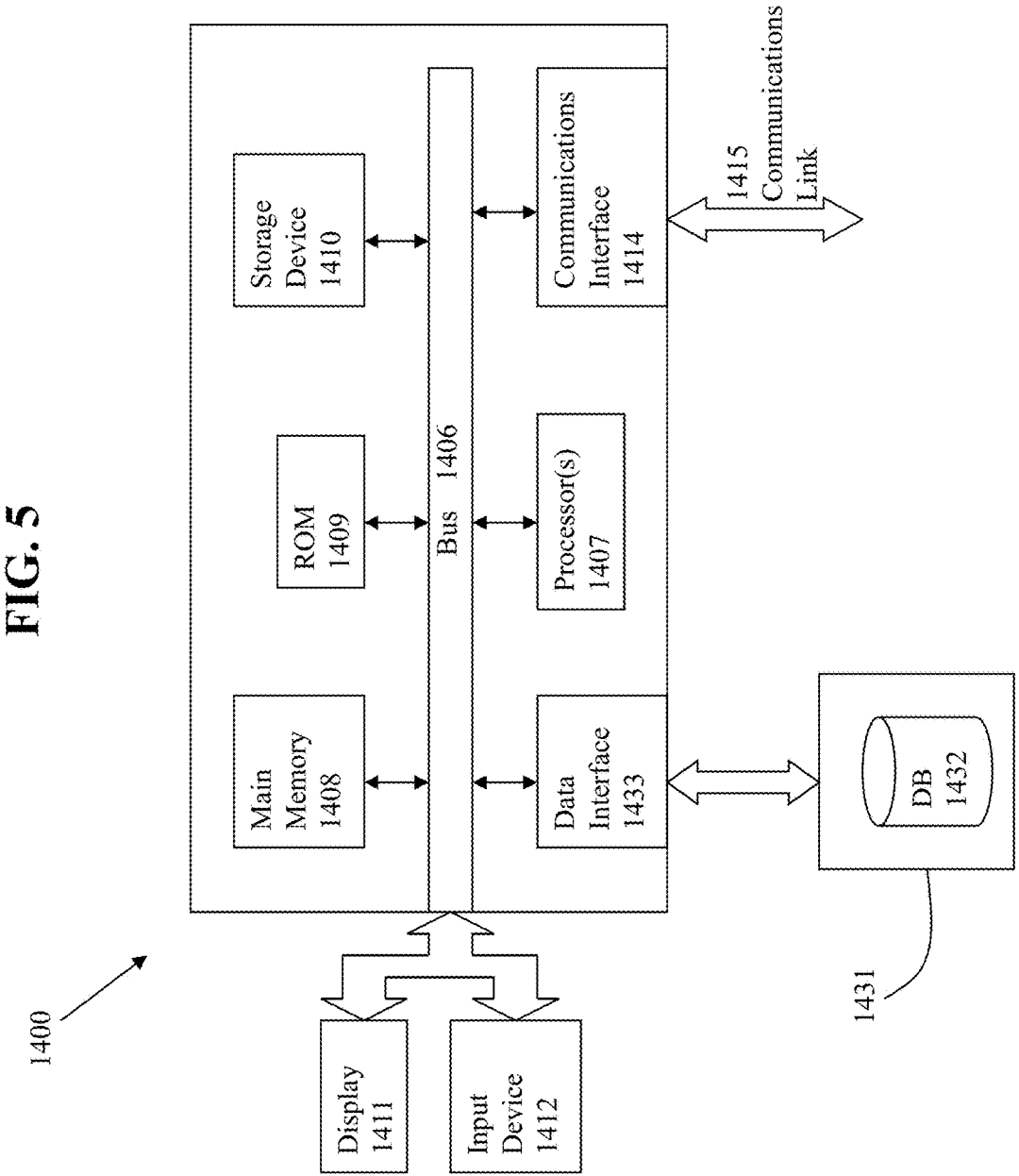
FIG. 5 depicts a computerized system on which an embodiment of the invention can be implemented.

FIG. 5 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method for implementing web services for a plurality of platforms utilizing a plurality of web service specification languages, comprising the steps:
  implementing a common data layer that represents a data input and an output of a web service for an application by performing ordered steps of:
    (a) creating a common class hierarchy for the application to invoke the web services, the common class hierarchy comprising a common set of object classes that is independent of a plurality of web service specification languages and a plurality of web proxies used by the plurality of platforms providing the web services;
    (b) generating a data control for the application after creating the common class hierarchy in step (a), wherein the data control is implemented on a layer that is separate from the common data layer, and that resides between the common data layer and an application layer that comprises one or more application pages corresponding to the application, at least two of the web service specification languages of the plurality of web service specification languages sharing the data control instead of using respective separate data controls; and
    (c) creating, after generating the data control in step (b), a mapping between the common class hierarchy and a plurality of web proxies corresponding to each of the plurality of web service specification languages, data being transferred between the common class hierarchy and each of a plurality of web proxies based at least in part on the mapping;
  generating the one or more applications page based at least in part on data received from the web service specification languages through the common data layer and the data control that was generated; and
  adding a new platform corresponding to using a new web service specification language by modifying the common data layer with additional mappings instead of creating new data controls for generating a new page for the new web service specification language.

2. The method of claim 1, wherein the plurality of web service specification languages are Web service description languages (WSDLs).

3. The method of claim 1, wherein each of the plurality of web service specification languages define the same web service.

4. The method of claim 1, wherein the common class hierarchy comprises a set of Java classes.

5. The method of claim 1, wherein the one or more application pages are mobile application pages.

6. The method of claim 1, further comprising:
  identifying a plurality of web proxies that are generated from a plurality of web service specification language files, wherein the plurality of web service specification language files implements web services for applications by generating a mobile application page that represent web-deployed user interfaces;
  sharing the common data layer between the application and another application, wherein the other application comprises at least some data that is in common with the application, the application and the other application both utilizing at least a same portion of the mapping in the common data layer;
  implementing additional functions required for the application in the common data layer, the additional functions not provided by the plurality of platforms utilizing the plurality of web service specification languages;
  transferring data between the proxy classes and the common class hierarchy through a payload that is sent from a particular proxy class associated with a particular web service specification language to a server associated with the platform deploying the web service, wherein the payload comprises an XML document; and
  managing technical differences between the plurality of web service specification languages and the common class hierarchy by calling different proxy based configurations.

7. A system embodied in a non-transitory medium for implementing web services utilizing a plurality of web service specification languages,
  an application to implement a common data layer that represents a data input and an output of a web service for an application by performing ordered steps of:
    (a) creating a common class hierarchy to invoke the web services, the common class hierarchy comprising a common set of object classes that is independent of a plurality of web service specification languages and a plurality of web proxies used by the plurality of platforms providing the web services;
    (b) generating a data control for the application after creating the common class hierarchy in step (a), wherein the data control is implemented on a layer that is separate from the common data layer, and that resides between the common data layer and an application layer that comprises one or more application pages corresponding to the application, at least two of the web service specification languages of the plurality of web service specification languages sharing the data control instead of using respective separate data controls; and
    (c) creating, after generating the data control in step (b), a mapping between the common class hierarchy and a plurality of web proxies corresponding to each of the plurality of web service specification languages, data being transferred between the common class hierarchy and each of a plurality of web proxies based at least in part on the mapping;
  generating the one or more application pages based at least in part on data received from the web service specification languages through the common data layer and the data control that was generated; and
  adding a new platform corresponding to using a new web service specification language by modifying the common data layer with additional mappings instead of creating new data controls for generating a new page for the web service specification language.

8. The system of claim 7, wherein the plurality of web service specification languages are Web service description languages (WSDLs).

9. They system of claim 7, wherein each of the plurality of web service specification languages defines the same web service.

10. The system of claim 7, wherein the common class hierarchy comprises a set of Java classes.

11. The system of claim 7, wherein the one or more application pages are mobile application pages.

12. A computer program product including a non-transitory computer readable medium having instructions which, when executed by a processor, cause the processor to perform a process for implementing web services for a plurality of platforms using a plurality of web service specification languages, the process comprising:

implementing a common data layer that represents a data input and an output of a web service for an application by performing ordered steps of:

(a) creating a common class hierarchy for the application to invoke the web services, the common class hierarchy comprising a common set of object classes that is independent of a plurality of web service specification languages and a plurality of web proxies used by the plurality of platforms providing the web services;

(b) generating a data control for the application after creating the common class hierarchy in step (a), wherein the data control is implemented on a layer that is separate from the common data layer, and that resides between the common data layer and an application layer that comprises one or more application pages corresponding to the application, at least two of the web service specification languages of the plurality of web service specification languages sharing the data control instead of using respective separate data controls; and (c) creating, after generating the data control in step (b), a mapping between the common class hierarchy and a plurality of web proxies corresponding to each of the plurality of web service specification languages, data being transferred between the common class hierarchy and each of a plurality of web proxies based at least in part on the mapping;

generating the one or more applications page based at least in part on data received from the web service specification languages through the common data layer and the data control that was generated; and adding a new platform corresponding to using a new web service specification language by modifying the common data layer with additional mappings instead of creating new data controls for generating a new page for the new web service specification language.

13. The computer program product of claim 12, wherein the plurality of web service specification languages are Web service description languages (WSDLs).

14. The computer program product of claim 12, wherein each of the plurality of web service specification languages define the same web service.

15. The computer program product of claim 12, wherein the common class hierarchy comprises a set of Java classes.

16. The computer program product of claim 12 wherein the one or more application pages are mobile application pages.

* * * * *

UNITED STATES PATENT AND TRADEMARK OFFICE
CERTIFICATE OF CORRECTION

PATENT NO. : 10,229,093 B2
APPLICATION NO. : 13/754869
DATED : March 12, 2019
INVENTOR(S) : Laurent et al.

Page 1 of 1

It is certified that error appears in the above-identified patent and that said Letters Patent is hereby corrected as shown below:

On the Title Page

In Column 1, Item (72) Inventors, Line 2, delete "Thorton" and insert -- Thornton --, therefor.

In the Drawings

On sheet 3 of 6, in FIG. 2, above Reference Numeral 201B, Line 3, delete "Opptunity" and insert -- Opportunity --, therefor.

In the Specification

In Column 3, Line 21, delete "WSLDs" and insert -- WSDLs --, therefor.

In Column 6, Line 55, delete "PTSN," and insert -- PSTN, --, therefor.

In the Claims

In Column 8, Line 63, in Claim 9, delete "They" and insert -- The --, therefor.

Signed and Sealed this
Second Day of March, 2021

Drew Hirshfeld
*Performing the Functions and Duties of the*
*Under Secretary of Commerce for Intellectual Property and*
*Director of the United States Patent and Trademark Office*